(12) United States Patent
Krabbendam et al.

(10) Patent No.: US 7,334,415 B2
(45) Date of Patent: Feb. 26, 2008

(54) COOLING SYSTEM AND METHOD FOR USING COOLING SYSTEM

(76) Inventors: Peter Jozef Krabbendam, Leewendalerstraat 41, 2046 AA, Haarlem (NL); Andries Peter Van Der Vegt, Kraanvogel 98, 4822 RB, Breda (NL); Marcus Claudius Leon Francis Blommaert, Vijverdamstraat 4, 9771, Nokere (BE)

( * ) Notice: Subject to any disclaimer, the term of this patent is extended or adjusted under 35 U.S.C. 154(b) by 267 days.

(21) Appl. No.: 11/085,486

(22) Filed: Mar. 21, 2005

(65) Prior Publication Data
US 2006/0000233 A1    Jan. 5, 2006

Related U.S. Application Data

(63) Continuation of application No. PCT/NL2003/000651, filed on Mar. 19, 2003.

(30) Foreign Application Priority Data
Sep. 19, 2002    (NL)    .................................... 1021495

(51) Int. Cl.
   *F25D 25/00*    (2006.01)
   *F25B 43/04*    (2006.01)
(52) U.S. Cl. ........................................... 62/62; 62/475
(58) Field of Classification Search .................... 62/62, 62/118, 259.4, 304, 475; 210/792
   See application file for complete search history.

(56) References Cited

U.S. PATENT DOCUMENTS

| | | | |
|---|---|---|---|
| 3,740,330 A | 6/1973 | Kneale | |
| 4,220,193 A | 9/1980 | Klaren | |
| 4,272,498 A * | 6/1981 | Faatz | 423/243.09 |
| 4,434,057 A * | 2/1984 | Marquardt | 210/638 |
| 4,464,315 A | 8/1984 | O'Leary | |
| 4,465,597 A * | 8/1984 | Herman et al. | 210/713 |
| 4,530,762 A * | 7/1985 | Love | 210/603 |
| 4,931,187 A | 6/1990 | Derham et al. | |
| 5,575,922 A * | 11/1996 | Green et al. | 210/713 |
| 5,888,385 A | 3/1999 | Ische et al. | |
| 6,296,761 B1 * | 10/2001 | Scheuerman, III | 210/189 |
| 6,322,705 B1 * | 11/2001 | Stornes | 210/669 |
| 6,544,421 B2 * | 4/2003 | Haridas et al. | 210/617 |
| 6,660,167 B1 * | 12/2003 | Walder et al. | 210/714 |
| 6,891,052 B1 * | 5/2005 | Tanner et al. | 554/161 |
| 6,893,567 B1 * | 5/2005 | Vanotti et al. | 210/605 |

FOREIGN PATENT DOCUMENTS

| | | |
|---|---|---|
| EP | 0 380 299 A1 | 8/1990 |
| EP | 0 568 159 A1 | 11/1993 |
| NL | 9200108 A * | 8/1992 |

* cited by examiner

*Primary Examiner*—Mohammad M. Ali
(74) *Attorney, Agent, or Firm*—Panitch Schwarze Belisario & Nadel LLP

(57) ABSTRACT

A cooling system is provided having a first heat exchanger for heating a cooling liquid, a second heat exchanger, which preferably comprises an evaporator, for cooling the cooling liquid, and a pump for guiding the cooling liquid through the first and second heat exchanger. The system includes a pellet reactor through which cooling liquid is fed, so as to remove impurities from the cooling liquid by grafting the impurities onto graft material in the pellet reactor. A method is also provided for using such a cooling system. An advantage of the system is especially that calcium salts can be grafted onto the graft material, as a result of which the concentration factor of the cooling system can be increased significantly.

19 Claims, 2 Drawing Sheets

COOLING SYSTEM AND METHOD FOR USING COOLING SYSTEM

CROSS-REFERENCE TO RELATED APPLICATIONS

This application is a continuation of International Application No. PCT/NL2003/000651, filed Mar. 19, 2003, the disclosure of which is incorporated herein by reference.

BACKGROUND OF THE INVENTION

The present invention relates to a cooling system, having a first heat exchanger for heating a cooling liquid and a second heat exchanger for cooling the cooling liquid, a pump for guiding the cooling liquid through pipes and through the first and second heat exchanger, a drain for discharge of cooling liquid from the system and a supply for addition of fresh cooling liquid into the system. Preferably, the second heat exchanger comprises an evaporator. The invention also relates to a method for using such a cooling system.

A cooling system and a method for using such a cooling system as mentioned above are known in the art. These known systems have the disadvantage, that deposition of salts, in particular calcium carbonate, is obtained on the heat exchanging surfaces at a relatively low concentration factor. Thus, if the second heat exchanger comprises an evaporator, cooling liquid is evaporated and discarded from the system. As a consequence, the cooling liquid is concentrated. The concentration factor of the cooling liquid in the system is restricted by the calcium content, or rather the solubility product of calcium salts, mainly calcium carbonate. Increasing the concentration factor beyond the limits of the solubility product, will cause calcium salt deposition, especially on the high temperature surfaces of the process heat exchangers, causing reduced cooling capacity or clogging.

Hereafter, reference will be made to water as a cooling liquid. However, it should be understood that instead of water other cooling liquids, known in the art and alternatively comprising additives, also can be used.

The addition of fresh water is also called make-up water. Since the second heat exchanger, for cooling the cooling liquid, usually comprises an evaporator, also a substantial amount of water is removed from the system by this evaporator. As a consequence, the impurities contained in the water remain in the system. Since the evaporated amount of water is made up with further make-up water, containing further impurities, the amount of the impurities steadily increases, as indicated above. In the art, it is common practice to discharge a part of the cooling liquid containing these salts from the system and to replace this part by fresh cooling liquid.

Because of the high costs of cooling liquid, the tendency in the industry is to discharge the cooling liquid continuously or periodically. Therefore, there will be almost constantly a high concentration of impurities in the water and, consequently, the known cooling systems have to be operated at a lower concentration factor by an increased blow down.

BRIEF SUMMARY OF THE INVENTION

The invention now aims at providing an improved cooling system with which the problems as indicated above will be reduced.

In particular, the present invention aims at providing a cooling system and a method for using a cooling system with which less water will have to be discharged, without increasing the scaling tendency.

The invention also aims at providing a cooling system and a method for using a cooling system with which the impurities in the cooling liquid can be at least partly removed and wherein a valuable product is obtained.

To this end, the present invention relates to a cooling system as mentioned above, which is characterized in that the system is connected to a pellet reactor having an inlet and an outlet for cooling liquid, the inlet being connected to any of the pipes of the system by a conduit for withdrawing liquid from the system, the outlet being connected to any of the pipes of the system by a conduit for feeding cooling liquid from the pellet reactor back to the system, the pellet reactor comprising a graft material for grafting impurities from the cooling liquid thereon. In this way the impurities, which otherwise would deposit on the heat exchanging surfaces of the cooling system, now deposit on the graft material in the pellet reactor. As a consequence, the heat exchanging surfaces of the cooling system remain clean, and the heat exchanging capacity remains constant, while operating with a higher concentration factor.

According to another embodiment, the invention is characterized in that the system is connected to a pellet reactor having an inlet and an outlet for cooling liquid, the inlet being connected to the supply for the addition of fresh cooling liquid and the outlet being connected to any of the pipes of the system for feeding fresh cooling liquid by a conduit from the pellet reactor into the system, the pellet reactor comprising a graft material for grafting impurities from the fresh cooling liquid thereon.

According to the invention, the supply of fresh cooling liquid and the discharge of cooling liquid from the system may take place continuously or intermittently.

Furthermore, since the impurities now are deposited on the graft material in the pellet reactor, the loaded graft material can be used for various purposes. The loaded graft material mainly comprises deposited calcium carbonate.

A further advantage of the present invention is that the amount of water, which has to be discharged in accordance with the known cooling systems, can now remain to a great extent in the cooling system. Thus, there is no further build-up of calcium impurities in the water. Therefore, less make-up water is necessary.

As a further consequence, the costs for using the cooling system are reduced significantly. Thus, less water is needed for supply and less discharge costs are implied.

According to the invention, the thermal efficiency of the system is not altered negatively, whereas the amount of make up water can be decreased significantly.

By the invention, the heat exchanging surfaces remain unaltered.

Therefore, the advantages obtained with the cooling system according to the invention are significant.

A further embodiment is characterized in that the pellet reactor comprises a supply for fresh graft material at a first level and discharge for loaded graft material at a second level. Such an embodiment is especially preferred if the system is used continuously. Thus, in that case the loaded graft material can be removed from the system and, at the same time, fresh graft material can be added to the system.

According to a further preferred embodiment, the system is characterized in that the inlet of cooling liquid to the pellet reactor is at a position below the outlet from the pellet reactor. Especially if the inlet is near the bottom of the reactor and the outlet is near the top of the reactor, it is possible that the pellet reactor is used as a fluidized bed reactor. Since the loaded graft material is heavier than the fresh, unloaded graft material, the loaded graft material will concentrate near the bottom of the pellet reactor whereas the fresh graft material will concentrate near the top of the reactor. Then, loaded graft material can be removed continuously or batch-wise from the bottom of the pellet reactor, whereas fresh graft material may be added at the top of the pellet reactor.

According to the invention, if the cooling system is operated continuously, only a part of the cooling liquid needs to be fed to the pellet reactor. After a given time, a constant concentration of calcium ions is obtained in the cooling liquid.

Since heat is evaporated continuously from the system also make-up water has to be added continuously. According to the invention, the amount of $Ca^{2+}$ ions in the cooling liquid can be controlled very precisely. Therefore, the concentration of the $Ca^{2+}$ ions can be controlled, such that the solubility product of these ions in the cooling liquid will not be exceeded. Then, deposition of Ca salts on the heat exchanging surfaces will not occur. The concentration of $Ca^{2+}$ ions in the cooling liquid which is circulated in the system may be higher than in the make up water, but it should never exceed the solubility product.

According to a further preferred embodiment of the cooling system according to the invention, a pellet reactor comprises a supply for adding a $CO_3^{2-}$ providing compound to the cooling liquid to be treated. Such a compound may comprise $CO_2$ gas. When added to water, almost instantaneously $CO_3^{2-}$ will be formed. Depending on the pH value of the liquid, it is also possible that $HCO_3^-$ is formed. However, such also forms part of the present invention. The addition of this compound, for example $CO_2$, may take place immediately before entering the cooling liquid into the pellet reactor. Anyway, the addition of the compound should take place somewhere at a position in the branch line, which leads from the cooling system to the inlet to the pellet reactor, or at a position near the bottom of the pellet reactor.

According to a further embodiment, the pellet reactor comprises a supply for adding a pH-regulating agent to the cooling liquid to be treated in the pellet reactor. A pH-value in the range of about 7 to 10 of the cooling liquid which is treated in the pellet reactor is preferred for providing deposition of calcium compounds on the graft material.

It is especially preferred if a pH-regulating agent together with the supply of a $CO_3^{2-}$ providing compound is added to the cooling liquid which is entered into the pellet reactor. By this combination of measures, a secure deposition of calcium carbonate ($CaCO_3$) on the graft material is obtained. The pH regulating agent may be added in the branch line or somewhere near the bottom of the pellet reactor.

It is especially preferred if the graft material comprises sand.

The cooling system according to the invention using the pellet reactor as indicated above mainly removes calcium impurities from the water. Therefore, there may be an increase of other impurities in the cooling liquid which do not impart a problem of depositions on the heat exchanging surfaces which may otherwise change the chemical and/or physical characteristics of the cooling liquid. Therefore, there still remains a preference to discharge part of the cooling liquid and replace it with new fresh water. However, the amount of water which has to be discharged from the cooling system is significantly lower than in cooling systems according to the state of the art.

According to a further aspect, the invention relates to a method for using a cooling system comprising:
 a first heat exchanger for heating a cooling liquid and a second heat exchanger, which comprises an evaporator, for cooling the cooling liquid,
 a pump for forcing the cooling liquid through pipes and through the first and second heat exchanger,
 a drain for discharging cooling liquid from the system, and
 a supply for adding fresh cooling liquid into the system.

This method is characterized in that it comprises the steps of:
 providing a pellet reactor comprising an inlet and an outlet,
 feeding liquid into the inlet of the pellet reactor from the cooling system and returning liquid from the outlet of the pellet reactor back into the cooling system,
 removing impurities from the cooling liquid which is fed through the pellet reactor by grafting the impurities on a graft material which is provided in the pellet reactor. In this way, it is prevented that impurities are deposited on the heat exchanging surfaces of the heat exchangers. Especially, deposition of impurities on the heat exchanging surfaces of the first heat exchanger is prevented.

According to another aspect, the invention relates to a method for using a cooling system comprising:
 a first heat exchanger for heating a cooling liquid and a second heat exchanger for cooling the cooling liquid,
 a pump for forcing the cooling liquid through pipes and through the first and second heat exchanger, wherein the pipes connect the pump and heat exchangers,
 a drain for discharging cooling liquid from the system, and
 a supply for adding fresh cooling liquid into the system.

The method is characterized in that it comprises the steps of:
 providing a pellet reactor comprising an inlet and an outlet,
 feeding fresh cooling liquid from the supply through the inlet into the pellet reactor, and feeding fresh cooling liquid from the outlet through conduit from the pellet reactor into the system, and
 removing impurities from the cooling liquid which is fed through the pellet reactor by grafting the impurities on a graft material which is provided in the pellet reactor.

Preferably, in the method according to another aspect, the second heat exchanger comprises an evaporator.

It is preferred that the graft material is kept in the fluidized state by the cooling liquid. In such a way, a thorough mixing of the graft material is obtained which secures an excellent contact between the cooling liquid and the graft material.

So as to keep the graft material in the fluidized state, the inlet to the pellet reactor is provided near the bottom thereof and the outlet is provided near the top of the reactor.

Since the graft material containing the deposited impurities, which mainly consist of calcium carbonate, are heavier than the fresh graft material particles, the loaded graft materials will find their way through to the bottom of the reactor, where they are preferably continuously or batch-wise removed from the reactor. Such a way of performing the method according to the invention is especially rendered possible if the graft material in the pellet reactor is kept in the fluidized state. Fresh graft material may be added at the top of the reactor.

So as to improve the deposition of calcium impurities from the cooling liquid on the graft material, a $CO_3^{2-}$ providing compound is added to the cooling liquid to be treated in the pellet reactor. Preferably, such a compound comprises $CO_2$ gas which is added to the liquid.

According to a further preferred method, a pH-reducing agent is added to the cooling liquid to be treated in the pellet reactor. Especially when combining these two measures, adding a $CO_3^{2-}$ providing compound and a pH-reducing agent, a secure deposition of calcium carbonate on the graft material will almost always be obtained.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
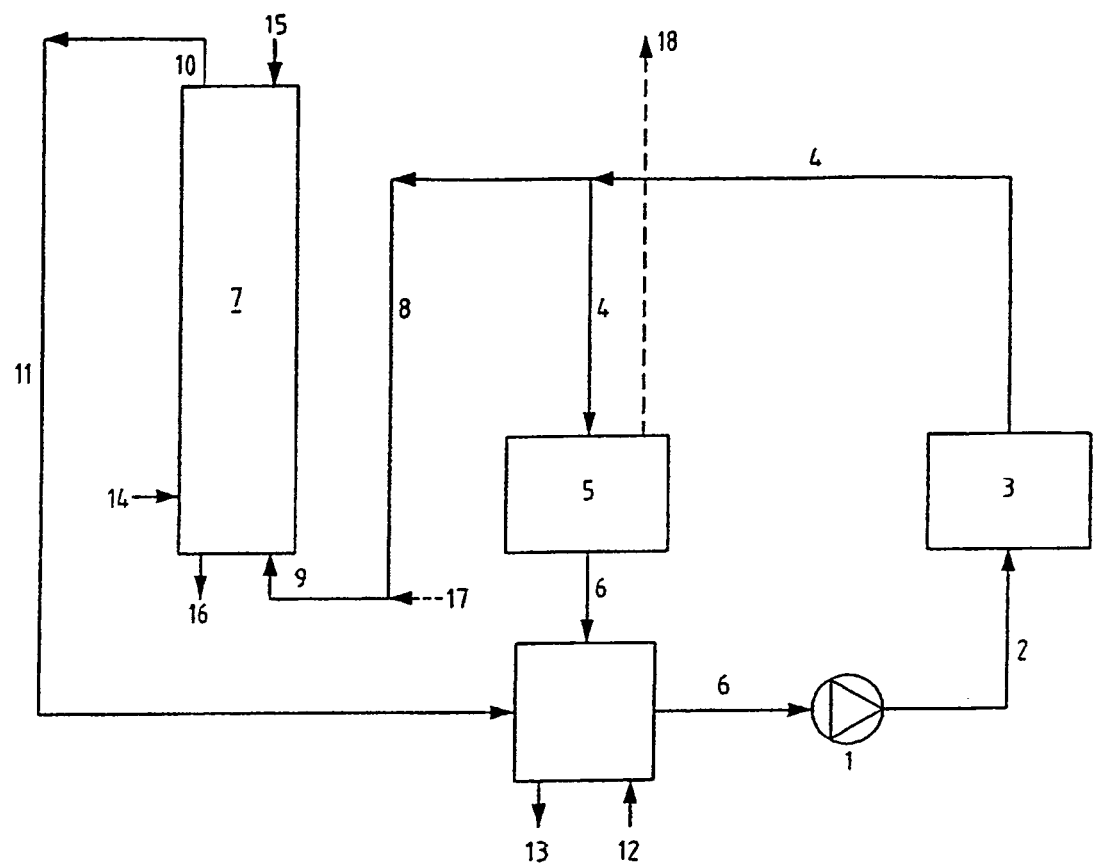
FIG. 1 is a schematic flow diagram of a cooling system according to the invention.

According to FIG. 1, cooling liquid is forced by a pump 1 through a pipe system 2 to a first heat exchanger 3 where cooling liquid is heated.

Subsequently, the heated cooling liquid is forced through a further pipe 4 to a second heat exchanger 5. The second heat exchanger 5 comprises an evaporator. The cooling liquid is cooled down in the second heat exchanger 5 by partially evaporating the cooling liquid. Loss of cooling liquid by evaporation, as indicated at 18, is made up by addition of fresh cooling liquid through make up 12. Subsequently, the cooled-down cooling liquid is returned to the pump 1 through pipes 6 and forced again to the first heat exchanger 3 through pipe system 2, where the cooling liquid is heated. A part of the cooling liquid through the pipe system 4 is branched off to a pellet reactor 7 through pipe system 8. The cooling liquid is supplied near the bottom 9 of the pellet reactor 7. Cooling liquid which has been treated in the pellet reactor 7 is removed near the top 10 of the pellet reactor 7 and is guided back by pipe system 11 to pipe system 6.

Cooling liquid may be removed from the system through blow down 13, if necessary. Cooling liquid which has been removed this way may be made up through make up 12.

As shown in the embodiment of FIG. 1, near the bottom 9 of the pellet reactor 7 a pH regulating agent is added at supply inlet 14. Preferably, sodium hydroxide is added. Sodium hydroxide has the purpose of increasing the pH-value of the cooling liquid which is added to the pellet reactor 7 near the bottom 9 and which usually has a pH value of less than 7. Also, it is shown in FIG. 1 that $CO_2$ is supplied in the pipe system 8 at supply injector 17 and therefore into the cooling liquid which is to be treated in the pellet reactor 7. By this combination of measures a secure removal of calcium in the form of calcium carbonate is obtained in the pellet reactor 7, by deposition of calcium carbonate on sand.

It is shown in FIG. 1 that pellets are removed from the pellet reactor 7 near the bottom 9 at discharge outlet 16. At this position pellets, which are loaded with calcium carbonate, are removed near the bottom, whereas fresh, unloaded graft material is supplied at the top of the pellet reactor 7 at supply inlet 15.

In use, the supply of cooling liquid will ensure a fluidized state of the graft material in the pellet reactor 7. A person skilled in the art will be able to determine the flow rate of the cooling liquid through the pellet reactor so as to ensure a fluidized state of the graft material, taking into account the particle size, particle weight, diameter of the reactor, height of the reactor, etc. Because of this fluidized state, an equilibrium will be established in the pellet reactor 7. The graft material containing the highest amount of calcium carbonate will concentrate near the bottom, whereas the graft material containing no calcium carbonate at all will concentrate at an uppermost part of the pellet reactor 7. By removing loaded graft material through discharge outlet 16 near the bottom 9 of the pellet reactor 7, the total amount of graft material is decreased. This is made up by fresh graft materials which are added by supply inlet 15 at the top 10 of the pellet reactor 7.

The deposition of calcium carbonate on the graft material is mainly obtained by crystallization of the calcium carbonate.

The calcium carbonate containing graft pellets may be removed continuously or batch-wise.

For example, the loaded graft material may be removed if it contains several times as much calcium carbonate as the original graft material. For example, if the graft material comprises sand particles, the amount of calcium carbonate on the particles may amount to several times the amount of sand.

In practice, the amount of $CO_2$ and NaOH, which is added to the cooling liquid treated in the pellet reactor 7, will depend on the composition of the cooling liquid.

In the FIG. 1 it is indicated that the $CO_2$ gas is injected at injector 17 into the cooling liquid in the pipe system 8. However, the injection may also take place at the bottom of the pellet reactor 7. The injection may be obtained by a Venturi tube, a nozzle, a static mixer, an aeration tube or any other type of reactor. It may also be added through inlet 14 together with the supply of sodium hydroxide or any other pH-regulating agent. Furthermore, the supply of $CO_2$ may take place in the pipe system 4.

The graft material may be any material which is suitable for depositing calcium carbonate. For example, the graft material may consist of sand, glass, plastics, carbon, or metal or metal oxide particles. It may also consist of inorganic material, for example non-soluble salts.

In the embodiment as described above and as shown in FIG. 1, the branch off through pipe 8 is provided between the first and the second heat exchanger. However, in this respect, it should be noted that the branch off may be provided anywhere in the system.

The ratio between the liquid flow through the pellet reactor and the liquid flow through the second heat exchanger (see FIG. 1) can be set, such that a sufficient removal of calcium is obtained. As mentioned before, the calcium concentration must be such that no deposition of calcium salts is obtained. In general a higher ratio will result in a higher removal of calcium from the liquid. A person skilled in the art will be able to determine such a preferred ratio. The LSI index (Langelier Solubility Index) is generally used for determining whether calcium deposition may occur.

Figure 2:
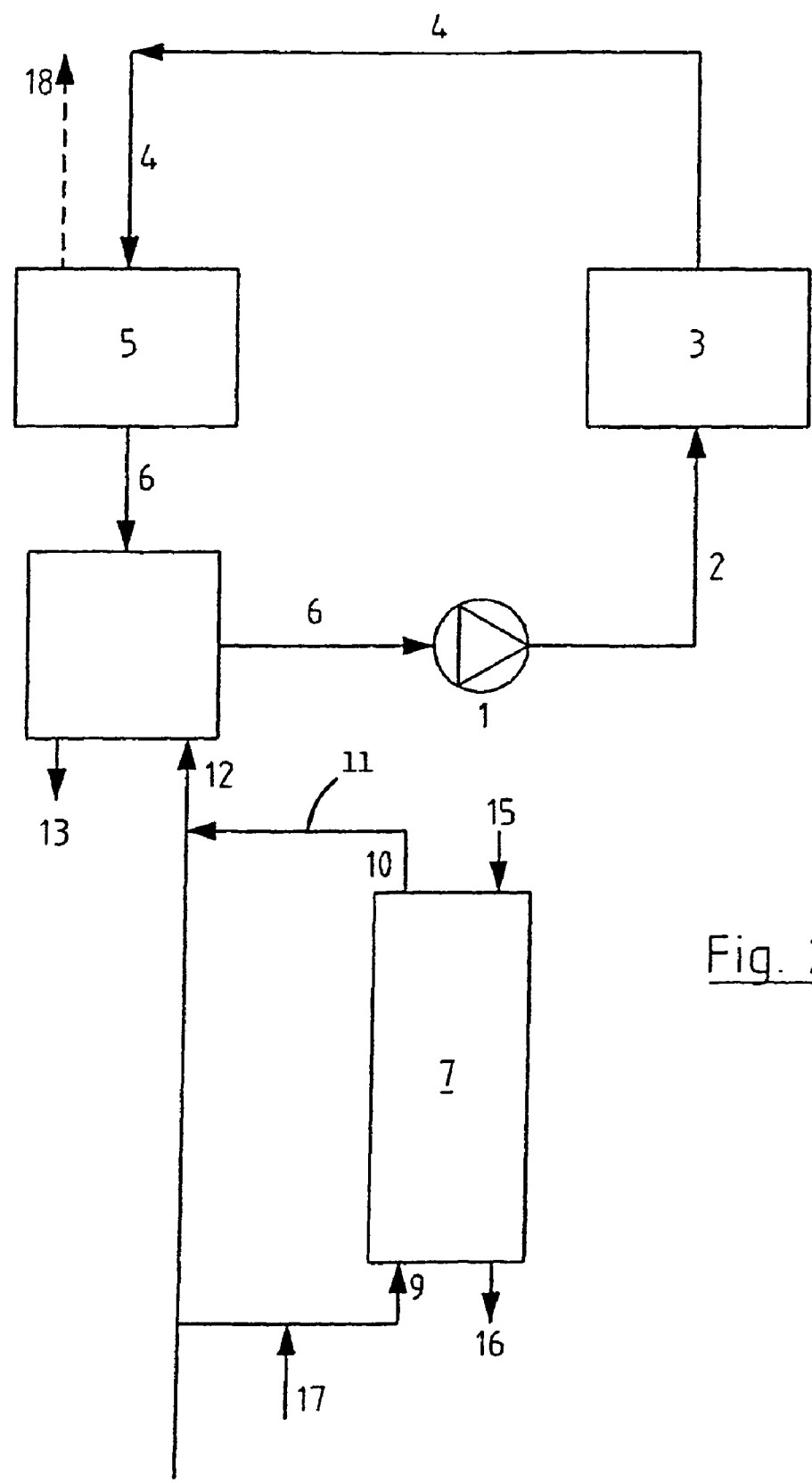
FIG. 2 is a schematic flow diagram of an embodiment according to another aspect of the invention.

Another embodiment of a cooling system according to the invention is shown in FIG. 2. The reference numerals in this Figure represent generally the same elements or features as in FIG. 1, and therefore will not be described again. According to this embodiment the pellet reactor 7 is positioned in the supply 12 to the cooling system. The pipe system 11 from the pellet reactor 7 is connected to the supply 12 of the system. In this way, fresh cooling liquid having a diminished calcium content is added to the system. Such an embodiment can be used in open systems, wherein the second heat exchanger is an evaporator, as well as in closed systems, so as to provide the system with cooling liquid having a low calcium concentration.

In the embodiment as shown in FIG. 2, the ratio between the liquid flow through the pellet reactor and the liquid flow which is fed directly to the cooling system, without being fed through the pellet reactor, can also be determined by a person skilled in the art on the same basis as indicated above with respect to the embodiment according to FIG. 1.

An example of a specific cooling system will now be given. However, it should be noted that this is only one example of a testing facility used to prove the efficiency of the invention and is not intended to limit the scope of protection of the invention.

The total cooling liquid volume is 150 liters. The evaporation amounts to 10 liters per hour, whereas a blow-down of 4.5 liters per hour is used. Therefore, 14.5 liters per hour of make-up water is added to the system. The amount of water in the pellet reactor and its pipe system is 150 liters in total. When in use, with an addition of 14.5 liters of fresh water each hour, the calcium hardness of the liquid initially amounts to about 752 milligrams calcium carbonate per liter. After three hours the calcium hardness has reached an amount of 270 milligrams per liter, which concentration value then is kept constant.

Therefore, it is clear that the concentration of calcium ions in the cooling liquid can be controlled precisely. For example, the concentration can be controlled such that the solubility product of calcium compounds is not exceeded. In that case, no calcium compounds will deposit on the heat exchanging surfaces of the cooling system. On the other hand, a certain calcium concentration may be maintained, so as to reduce risk of corrosion problems in the system.

As a matter of fact, the pellet reactor can also advantageously be used for removing calcium content from blow down liquid, so as to decrease the concentration of impurities in water which is blown down from the system.

Furthermore, less water has to be discharged as a blow-down, which leads to increased economics of the cooling system.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A cooling system comprising a first heat exchanger (3) for heating a cooling liquid and a second heat exchanger (5), which comprises an evaporator, for cooling the cooling liquid, a pump (1) for guiding the cooling liquid through pipes (2, 4, 6) and through the first and second heat exchangers (3, 5), a drain (13) for discharge of cooling liquid from the system and a supply (12) for addition of fresh cooling liquid into the system, wherein the system is connected to a pellet reactor (7) having an inlet (9) and an outlet (10) for cooling liquid, the inlet (9) being connected to any of the pipes (2, 4, 6) of the system by a conduit (8) for withdrawing liquid from the system, the outlet (10) being connected to any of the pipes (2, 4, 6) of the system by a conduit (11) for feeding cooling liquid from the pellet reactor (7) back to the system, and the pellet reactor (7) comprising a graft material for grafting impurities from the cooling liquid thereon.

2. The cooling system according to claim 1, wherein the pellet reactor (7) comprises a supply (15) for fresh graft material at a first level and a discharge (16) for loaded graft material at a second level.

3. The cooling system according to claim 1, wherein the inlet (9) of the pellet reactor (7) is at a position below the outlet (10) of the pellet reactor (7).

4. The cooling system according to claim 3, wherein the inlet (9) is near a bottom of the reactor (7) and the outlet (10) is near a top of the reactor (7).

5. The cooling system according to claim 1, wherein the system comprises a supply (17) for adding a $CO_3^{2-}$ providing compound to the cooling liquid to be treated in the pellet reactor (7).

6. The cooling system according to claim 5, wherein the $CO_3^{2-}$ providing compound comprises gaseous $CO_2$.

7. The cooling system according to claim 1, wherein the system comprises a supply (14) for adding a pH-regulating agent to the cooling liquid to be treated in the pellet reactor (7).

8. A cooling system comprising a first heat exchanger (3) for heating a cooling liquid and a second heat exchanger (5) for cooling the cooling liquid, a pump (1) for guiding the cooling liquid through pipes (2, 4, 6) and through the first and second heat exchanger (3, 5), a drain (13) for discharge of cooling liquid from the system and a supply (12) for addition of fresh cooling liquid into the system, wherein the system is connected to a pellet reactor (7) having an inlet (9) and an outlet (10) for cooling liquid, the inlet (9) being connected to the supply (12) for the addition of fresh cooling liquid and the outlet (10) being connected to any of the pipes (2, 4, 6) of the system for feeding fresh cooling liquid by a conduit (11) from the pellet reactor (7) into the system, and the pellet reactor (7) comprising a graft material for grafting impurities from the fresh cooling liquid thereon.

9. The cooling system according to claim 8, wherein the second heat exchanger (5) comprises an evaporator.

10. A method for treating a cooling system comprising:
   a first heat exchanger (3) for heating a cooling liquid and a second heat exchanger (5), which comprises an evaporator, for cooling the cooling liquid,
   a pump (1) for forcing the cooling liquid through pipes (2, 4, 6) and through the first and second heat exchanger,
   a drain (13) for discharging cooling liquid from the system, and
   a supply (12) for adding fresh cooling liquid into the system,
   wherein the method comprises the steps of:
      providing a pellet reactor (7) comprising an inlet (9) and an outlet (10),
      feeding liquid into the inlet (9) of the pellet reactor (7) from the cooling system and returning liquid from the outlet (10) of the pellet reactor (7) back into the cooling system, and
      removing impurities from the cooling liquid which is fed through the pellet reactor (7) by grafting the impurities on a graft material which is provided in the pellet reactor (7).

11. The method according to claim 10, wherein the method further comprises keeping the graft material in a fluidized state by the cooling liquid.

12. The method according to claim 10, wherein the method further comprises providing the inlet (9) near the bottom of the pellet reactor (7) and providing the outlet (10) near the top of the pellet reactor (7).

13. The method according to claim 10, wherein the method further comprises adding fresh graft material through a supply (15) near a top of the pellet reactor (7) and discharging loaded graft material through a discharge (16) near a bottom of the pellet reactor (7).

14. The method according to claim 10, wherein the method further comprises adding a $CO_3^{2-}$ providing compound through a supply (17) to the cooling liquid to be treated in the pellet reactor (7).

15. The method according to claim 10, wherein the method further comprises adding a pH-regulating agent through a supply (14) to the cooling liquid to be treated in the pellet reactor (7).

16. The method according to claim 10, further comprising using the graft material grafted with impurities in at least one application selected from the group consisting of building construction, civil engineering, fertilizer, cultivation, and agriculture.

17. The method according to claim 14, wherein the $CO_3^{2-}$ providing compound comprises gaseous $CO_2$.

18. A method for treating a cooling system comprising:
    a first heat exchanger (3) for heating a cooling liquid and a second heat exchanger (5) for cooling the cooling liquid,
    a pump (1) for forcing the cooling liquid through pipes (2, 4, 6) and through the first and second heat exchanger, wherein the pipes (2, 4, 6) connect the pump (1) and heat exchangers (3, 5),
    a drain (13) for discharging cooling liquid from the system, and
    a supply (12) for adding fresh cooling liquid into the system,
    wherein the method comprises the steps of:
    providing a pellet reactor (7) comprising an inlet (9) and an outlet (10),
    feeding fresh cooling liquid from the supply (12) through the inlet (9) into the pellet reactor (7), and feeding fresh cooling liquid from the outlet (10) through conduit (11) from the pellet reactor (7) into the system, and
    removing impurities from the cooling liquid which is fed through the pellet reactor (7) by grafting the impurities on a graft material which is provided in the pellet reactor (7).

19. The method according to claim 18, wherein the second heat exchanger (5) comprises an evaporator.

* * * * *